United States Patent [19]

Mueller

[11] Patent Number: 4,466,518

[45] Date of Patent: Aug. 21, 1984

[54] ENGAGEMENT MODULATOR FOR TORQUE CONVERTER BYPASS

[75] Inventor: Robert S. Mueller, Birmingham, Mich.

[73] Assignee: Eaton Corporation, Cleveland, Ohio

[21] Appl. No.: 397,739

[22] Filed: Jul. 13, 1982

[51] Int. Cl.$^3$ .............................................. F16D 25/04
[52] U.S. Cl. ................................ 192/3.29; 192/88 A; 192/109 D
[58] Field of Search .................... 192/3.28, 3.29, 3.3, 192/3.33, 3.57, 109 F, 109 D, 85 A, 85 AA, 88 A, 88 B, 52

[56] References Cited

U.S. PATENT DOCUMENTS

| | | | |
|---|---|---|---|
| 2,736,412 | 2/1956 | Livezey | 192/85 |
| 3,151,717 | 10/1964 | Kaptur et al. | 192/3.2 |
| 3,213,983 | 10/1965 | Smirl et al. | 192/3.3 |
| 3,384,209 | 5/1968 | Murphy | 192/3.33 |
| 3,516,524 | 5/1970 | Kelty et al. | 192/3.3 |
| 3,693,478 | 9/1972 | Malloy | 74/731 |
| 3,949,847 | 4/1976 | Hoehn | 192/3.3 |
| 3,966,032 | 6/1976 | Koivunen | 192/3.3 |
| 3,972,397 | 8/1976 | Cheek | 192/3.3 |
| 4,167,993 | 9/1979 | Vukovich et al. | 192/3.3 |
| 4,181,203 | 1/1980 | Malloy | 192/3.3 |
| 4,317,510 | 3/1982 | Staub | 192/3.29 |

Primary Examiner—George H. Krizmanich
Assistant Examiner—M. Manley

Attorney, Agent, or Firm—C. H. Grace; P. S. Rulon

[57] ABSTRACT

A viscous coupling adapted to be positioned within the housing of a torque converter automatic transmission for use as a bypass of the torque converter and including an annular clutch lining secured to a side face of the outer peripheral portion of the coupling and a control valve assembly positioned in the outer peripheral portion to cushion the impact of engagement of the annular clutch lining with the confronting surface of the torque converter housing. The control valve assembly includes a rolling diaphragm which extends across the open end of an axially extending bore in the outer peripheral portion and is arranged to rollingly traverse the bore to successively cover or uncover a series of axially spaced leakage holes communicating with the main chamber of the torque converter and the bore. The end of the bore remote from the diaphragm communicates with the side of the coupling carrying the annular clutch lining at a location radially inwardly of the clutch lining so that, upon initial engagement of the coupling, leakage flow may occur through the leakage holes from the main chamber of the torque converter to the other side of the coupling to cushion the impact of the clutching engagement and the leakage flow is thereafter gradually cut off to apply the full clutch force as the rolling diaphragm traverses the bore to successively cover the leakage holes.

5 Claims, 5 Drawing Figures

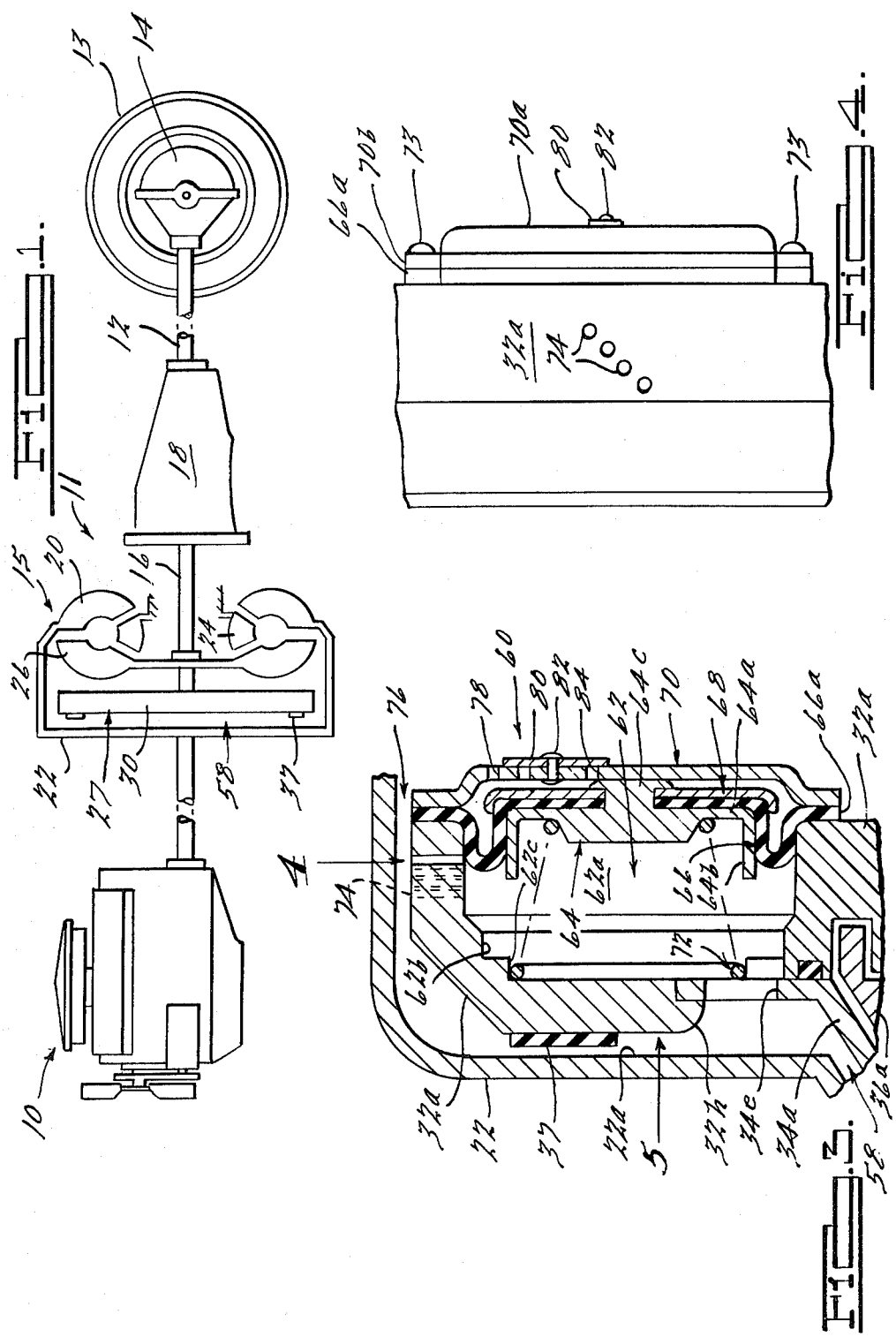

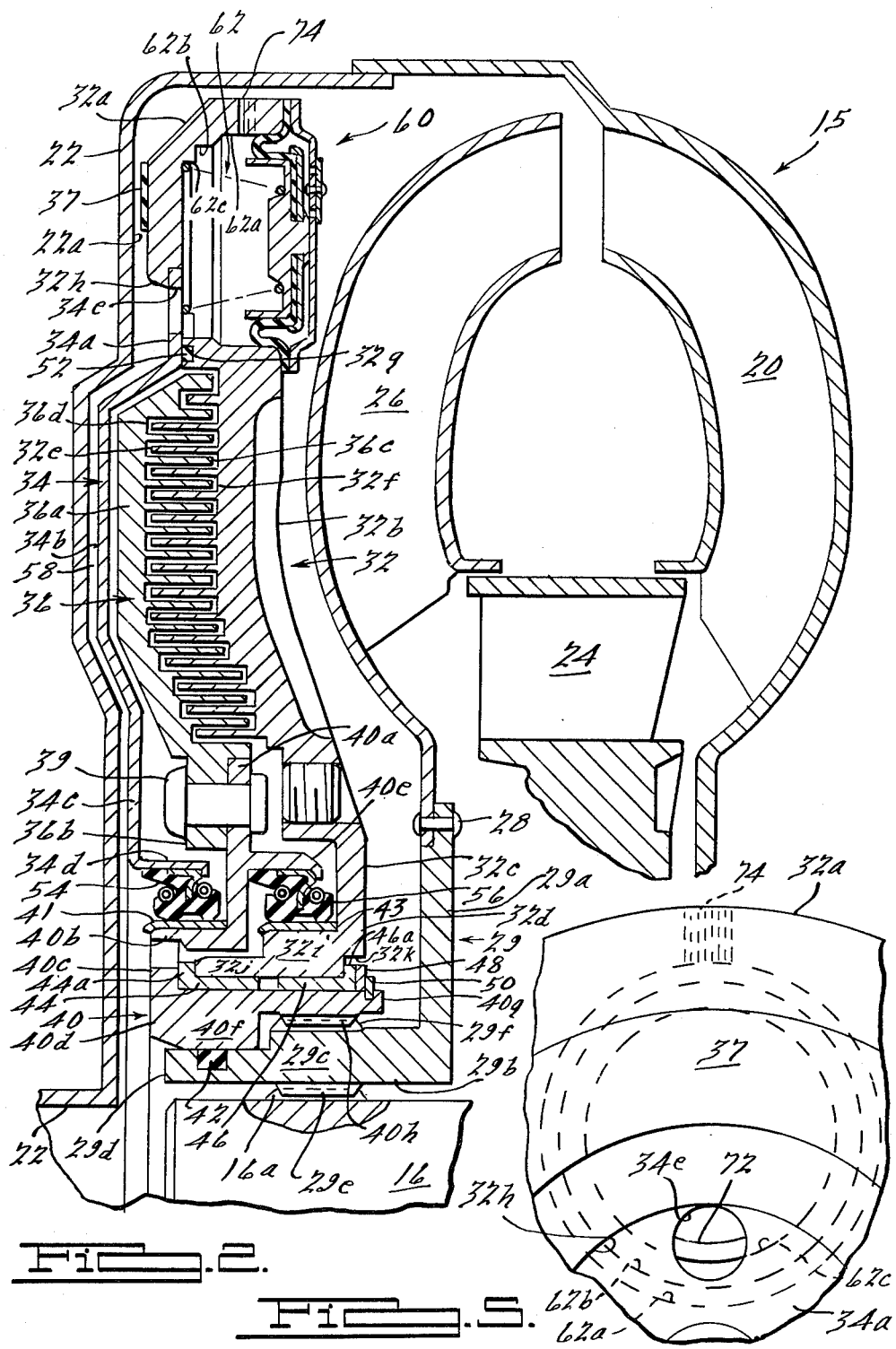

ENGAGEMENT MODULATOR FOR TORQUE CONVERTER BYPASS

BACKGROUND OF THE INVENTION

This invention relates to automatic torque converter transmissions for motor vehicle applications. More particularly, it relates to automatic torque converter transmissions having means to selectively bypass the torque converter and, even more particularly, to a viscous coupling utilized in a torque converter bypass.

Torque converter type automatic transmissions have achieved almost universal application and acceptance in motor vehicles. While generally satisfactory in this application, torque converter automatic transmissions embody inherent slip and therefore incorporate inherent losses in vehicular fuel economy. In an effort to minimize this slippage and thereby optimize fuel economy, various efforts have been made to bypass the torque converter with some manner of direct drive which is typically brought into engagement when the vehicle is operating in the higher gear ratios and above a predetermined vehicular speed. While these direct drive bypass arrangements have resulted in improvements in fuel economy, they have also tended to engage rather abruptly. This abrupt engagement can be sensed in the passenger compartment of the motor vehicle, resulting in a derogation in the ride quality of the vehicle.

SUMMARY OF THE INVENTION

Accordingly, it is the object of the present invention to provide a torque converter bypass coupling that is characterized by a smooth, quiet, essentially undiscernible engagement.

The torque converter viscous bypass coupling of the present invention is of the type including an annular generally planar coupling adapted to be positioned within the housing of the torque converter and defining, with the torque converter housing, a main chamber at one side of the coupling receiving the torque converter and a secondary chamber on the other side of the coupling. The coupling has a radially inner portion adapted to be drivingly connected to the output shaft of the torque converter and a radially outer peripheral portion defining a radially extending annular clutching surface adapted for clutching coaction with a confronting inner surface of the housing of the torque converter.

According to one feature of the invention, a control valve assembly is positioned in the outer peripheral portion of the coupling. The valve assembly comprises an axially extending bore in the outer peripheral portion of the coupling opening in the main chamber, a rolling diaphragm positioned across the open end of the bore and arranged to traverse at least a portion of the axial length of the bore, spring means disposed in the bore and arranged to urge the diaphragm to a normal position in which it is disposed generally adjacent the open end of the bore, first fluid passage means extending between the main chamber and a location in the bore traversed by the diaphragm, and second fluid passage means, having a larger fluid capacity than the first passage means, extending between a portion of the bore not traversed by the diaphragm and a location in the secondary chamber radially inwardly of the clutching surface. With this arrangement, when the secondary chamber is vented to apply the coupling, the initial apply force is relatively low since fluid is allowed to leak through the first passage means, into the bore, and through the second passage means into the secondary chamber so that the pressure in the secondary chamber is prevented from dropping too abruptly and the pressure differential across the coupling is initially moderated. As the rolling diaphragm traverses the bore in response to the main chamber pressure acting against the side of the diaphragm remote from the spring means, the first passage means is gradually covered and the pressure in the secondary chamber is gradually allowed to drop to a totally vented condition to apply the full pressure differential across the coupling and achieve full clutching capacity.

According to a further feature of the invention, a rigid cover is positioned across the open end of the bore between the diaphragm and the main chamber and bleed means are provided in the cover to control the application of main chamber pressurized fluid to the diaphragm and thereby selectively control the traversing time of the diaphragm.

According to yet another feature of the invention, the first fluid passage means comprises a plurality of holes opening at their one ends in the radially outer annular edge of the coupling and at their other ends at axially spaced locations in the bore so that the holes are successively covered by the diaphragm as the diaphragm traverses the bore.

These and other objects, features, and advantages of the invention will become apparent from the following Detailed Description of the Preferred Embodiment of the Invention.

BRIEF DESCRIPTION OF THE DRAWINGS

FIG. 1 is a schematic view of a motor vehicle drivetrain including a torque converter type automatic transmission employing a torque converter bypass drive embodying a viscous coupling;

FIG. 2 is a fragmentary cross sectional view on an enlarged scale of the torque converter and viscous coupling bypass seen schematically in FIG. 1;

FIG. 3 is a cross sectional view on an enlarged scale of a peripheral portion of the viscous coupling seen in FIG. 2; and FIGS. 4 and 5 are fragmentary views looking in the directions of the arrows 4 and 5 in FIG. 3.

DETAILED DESCRIPTION OF THE PREFERRED EMBODIMENT

The motor vehicle drivetrain seen schematically in FIG. 1 includes an internal combustion engine 10, an automatic transmission 11 and a propeller shaft 12 driving rear wheels 13 through a differential 14.

Transmission 11 includes a torque converter 15 having an output shaft 16 and a gear ratio box 18 driven by torque converter output shaft 16. Torque converter 15 is filled with automatic transmission fluid and includes, in known manner, a pump 20 driven from engine 10 through torque converter housing 22, a stator 24, and a turbine 26 driven hydrokinetically by pump 20.

Torque converter 15 further includes a bypass drive line seen generally at 27 in FIG. 1. Bypass drive line 27 is effective when actuated to provide a direct drive between torque converter housing 22 and torque converter output shaft 16 through a viscous coupling 30 thereby bypassing the high slippage drivepath through pump 20 and turbine 26.

Turbine 26, as seen in FIG. 2, is secured by rivets 28 to an annular mounting member 29. Mounting member 29 includes an annular radially extending mounting portion 29a and an annular axially extending hub portion 29b extending leftwardly from the radially inner edge of mounting portion 29a. Hub portion 29b in turn includes a relatively thick portion 29c and a relatively thin free end portion 29d. The inner periphery of portion 29b is splined at 29e for coaction with splines 16a on output shaft 16, whereby rotation of turbine 26 effects rotation of output shaft 16.

Viscous coupling 30 is generally circular and generally planar and is of a sandwich construction. It includes an annular housing assembly, adapted to be positioned within the housing 22 of the torque converter and having axially spaced annular side wall members defining an annular clutch chamber therebetween, and an annular clutch member disposed within the clutch chamber. One side wall of the annular housing is constituted by a body member 32 and the other side wall member of the annular housing is constituted by a cover member 34. A clutch member 36 is interposed between body 32 and cover 34. Cover 34 is preferably formed as a steel stamping and body 32 and clutch 36 are preferably formed as permanent mold aluminum castings.

Body 32 includes a radially outer peripheral portion 32a, an intermediate portion 32b, and a radially inner portion 32c terminating in a hub portion 32d extending axially leftwardly as viewed in FIG. 2 from the radially inner edge of inner portion 32c. Intermediate portion 32b is machined on its inner or left, as viewed in FIG. 2, face to form a series of annular lands 32e separated by a series of annular grooves 32f. Another annular groove 32g is machined in the inner face of body 32 radially outwardly of lands and grooves 32e, 32f. An annular clutch lining 37 is adhesively secured to the inner or left face of outer peripheral portion 32a for clutching coaction with the confronting inner surface 22a of torque converter housing 22.

Cover 34 includes a radially outer peripheral portion 34a held in a position seated against the inner or left face of body outer peripheral portion 32a by a rollover 32h on body 32, an intermediate portion 34b, and a radially inner portion 34c terminating in an inwardly, or rightwardly, turned lip portion 34d.

Intermediate portions 32b and 34b of the body and cover are configured to define the chamber which receives clutch 36.

Clutch 36 includes a working portion 36a and a mounting portion 36b. The side of working portion 36a confronting body 32 (the right side in FIG. 2) is machined to form a series of annular lands 36c separated by a series of annular grooves 36d. Lands 32e on body 32 are interdigitally arranged with respect to lands 36c on clutch 36. Mounting portion 36b is secured by rivets 39 to a clutch hub member 40 which, together with clutch 36, forms an annular clutch assembly.

Clutch hub member 40 is formed as an iron casting and includes an annular radially extending mounting flange or bridge portion 40a receiving the rivets 39, an annular axially extending seal or intermediate portion 40b extending leftwardly from the radially inner edge of bridge portion 40a, an annular radially extending end portion 40c, an annular axially extending hub portion 40d extending rightwardly from the radially inner edge of end portion 40c, and an annular flange portion 40e extending axially inwardly, or rightwardly, from flange portion 40a radially inwardly of rivets 39. Annular hub portion 40d in turn includes a relatively thick annular portion 40f and a relatively thin free end portion 40g which nest in complementary fashion with portions 29c and 29d of mounting member hub portion 29b. An annular wear sleeve 41 of hardened steel is pressed onto the outer periphery of portion 40b of clutch hub member 40. The inner periphery of portion 40g is splined at 40h for coaction with splines 29f on the outer periphery of portion 29c of mounting hub member 29. The inner periphery of portion 40f forms a cylindrical sealing surface for coaction with an elastomer square cut sealing ring seal 42 mounted in an annular groove in free end portion 29d of mounting hub member 29.

Hub portion 32d of body 32 includes a relatively thick portion 32i and a relatively thin free end portion 32j. An annular wear sleeve 43 of hardened steel is pressed onto the outer periphery of relatively thick portion 32i. Relatively thin free end portion 32j extends axially into the U-shaped annular cavity defined by portions 40b, 40c and 40d of clutch hub member 40. Hub portion 32d is journaled on clutch hub portion 40d by bronze bushings 44 and 46 pressed onto body hub portion 32d. Bushing 44 is interposed between body hub portion 32j and clutch hub portion 40f with a flange portion 44a positioned between the free end annular edge of body hub portion 32j and the confronting annular surface on clutch hub portion 40c. Bushing 46 is interposed between body hub portion 32i and clutch hub portion 40g with a flange portion 46a received in an annular notch 32k formed in body hub portion 32d. A washer 48, held in place by a snap ring 50 received in a suitable annular groove in clutch hub portion 40g, limits axial movement of clutch hub portion 40d.

The viscous coupling is filled with a silicone fluid, for example, dimethyl polysiloxane. The silicone liquid is prevented from escaping radially outwardly by an elastomeric square cut sealing ring seal 52 received in annular groove 32g. The silicone fluid is prevented from escaping radially inwardly by a pair of double-lip elastomer seals 54, 56 positioned respectively between the outer periphery of wear sleeve 41 and the confronting inner periphery of cover lip portion 34d, and between the outer periphery of wear sleeve 43 and the confronting inner periphery of flange 40e. Seals 54, 56 also preclude leakage of automatic transmission fluid into the viscous coupling.

In the operation of the viscous coupling as thus far described, automatic transmission fluid is normally admitted to the torque converter environment through the annular passage or chamber 58 formed between cover 34 and torque converter housing 22. The presence of the fluid in chamber 58 acting against cover 34 moves the viscous coupling, on splines 29f, to the right as viewed in FIG. 2 to its illustrated disengaged position wherein lining 37 is separated from housing surface 22a to form an annular passage past the lining. The extent of rightward or disengaging movement is determined by the axial distance between the confronting annular shoulder surfaces defined on portions 40f and 29c and the disengaged position is defined by engagement of these shoulder surfaces. The fluid thus flows radially outwardly in passage or chamber 58, past lining 37, and into the main chamber of the torque converter. When it is desired to engage the bypass drive line, as, for example, when the vehicle is operating in a higher gear ratio and above a predetermined vehicle speed, the direction of flow of the automatic transmission fluid in the torque converter is reversed by actuation of a suitable solenoid valve, not shown. Specifically, chamber 58 is vented to atmosphere and automatic transmission fluid under pressure is now admitted to the main chamber of the torque converter where it acts against body 32 and slides the viscous coupling to the left as viewed in FIG. 2, to bring lining 37 into frictional engagement with housing surface 22a.

A control valve assembly, seen generally at 60 in FIGS. 2, 3, and 4, is provided to moderate what would otherwise be an abrupt engagement of the coupling with the torque converter housing, an engagement that, without moderation, could be readily sensed in the passenger compartment of the associated vehicle with consequent variegation in the ride quality of the vehicle.

Control valve assembly 60 comprises an axial blind bore 62 in body outer peripheral portion 32a, a piston 64, a rolling diaphragm 66, a retainer cap 68, a cover 70, and a tapered coil spring 72.

Bore 62 opens at the right face of outer peripheral portion 32a and includes a main bore portion 62a, a first counterbore portion 62b, and a further counterbore portion 62c. The portion of counterbore 62c disposed below rollover 32h opens at the left face of outer peripheral portion 32a and coacts with a hole 34e in cover outer peripheral portion 34a to provide communication with the left face of the coupling. The material of portion 32a between counterbore 62b and 62c and overlaid by hole 34e is also removed so that the entire area of hole 34e communicates with bore 62.

Piston 64 is formed of aluminum and includes a main body portion 64a, a skirt portion 64b and a rivet portion 64c.

Rolling diaphragm 66 is formed of a fabric reinforced elastomeric material and has a central hole receiving rivet portion 64c of piston 64.

Retainer cap 68 is formed of aluminum and has a central hole receiving rivet portion 64c of piston 64.

Rivet portion 64c is initially formed as an upstanding post whereafter diaphragm 66 and cap 68 are slipped over the post whereafter the free end of the post is suitably peened over to form the illustrated rivet configuration firmly securing the diaphragm and cap to piston 64.

Cover 70 includes a raised central portion 70a and a peripheral flange portion 70b. Screws 73 secure cover 70 to body portion 32a with the peripheral flange portion 66a of diaphragm 66 clamped between cover 70 and body portion 32 to close off bore 62 at the right face of the coupling.

The larger end of tapered coil spring 72 seats in counterbore 62c and the smaller end seats around raised central portion 64c of piston 64.

A plurality of small radial holes 74 are provided in outer peripheral portion 32a of body 32. Holes 74 communicate at their radially inner end with bore 62 and at their radially outer end with the annular space 76 between the radially outer peripheral surface of body portion 32a and the confronting inner surface of cover 22. As best seen in FIG. 4, holes 74 are skewed to lie on a line which is approximately 45° to the central axis of the coupling.

A vent or bleed hole 78 is provided in cover 70. A rubber flapper valve 80, secured by a rivet 82 to cover 70, normally covers further or auxiliary bleed holes 84 in the cover. Valve assembly 60 assumes the configuration seen in FIGS. 2 and 3 when the transmission is operating in its normal mode, i.e., when transmission fluid is being admitted to the torque converter environment through passage 58 and flowing radially outwardly past line 37 into the main chamber of the torque converter. In this configuration, diaphragms 66 is rolled to the right, where it uncovers holes 74, by the combined force of the fluid pressure acting against the right face of piston 64 and the rightward bias of spring 72 which exceeds the force of the fluid pressure acting against the right face of retainer 68. The rightmost position of the diaphragm is determined by the engagement of rivet portion 64c of piston 64 with the confronting inner surface of cover 70. Rivet portion 64c also functions to provide a spacing between retainer cap 68 and cover 70.

When the direction of flow of automatic transmission fluid in the torque converter is reversed and chamber 58 is vented to atmosphere to actuate the bypass drive line, coupling 60 moves to the left to bring lining 37 into frictional engagement with housing surface 22a. The initial engagement force is relatively moderate however, despite the presence of high pressure fluid acting against the right face of the coupling and the vented condition of the fluid acting against the left face of the coupling, since fluid bleeds through all four bleed holes 74, through bore 62 and through opening 34e into chamber 58 to maintain a moderate pressure in that chamber despite its vented configuration and decrease the pressure differential acting across the coupling. Immediately following this relatively soft initial engagement, diaphragm 66 begins to roll to the left under the force of fluid entering through bleed hole 78 and acting against the right face of retainer cap 68. As diaphragm 66 rolls to the left it successively covers one, then two, then three, and then, finally, all four holes 74 so that the bleed flow into chamber 58 through hole 74 is gradually reduced and finally totally eliminated. As the bleed flow decreases, the pressure of chamber 58 gradually decreases and the pressure differential acting across the coupling gradually increases to gradually increase the applied force at the interface of lining 37 and the torque converter housing. In the final clutch apply configuration, diaphragm 66 rolled all the way to the left, as seen in phantom in FIG. 3, the pressure in chamber 58 falls to substantially zero and the pressure differential between the main chamber pressure, which may for example approximate 100 PSI, and chamber 58 is applied across the coupling to provide full clutch apply force to the coupling. In a typical installation in a transmission employed in an automotive passenger vehicle, the various parameters may be selected to provide a total traverse time for the rolling diaphragm of approximately three seconds. That is, three seconds after the initial soft engagement of the clutch surfaces, the full potential apply force has been applied to the coupling and the clutch operates at full capacity.

When the direction of flow of transmission fluid is again reversed to introduce pressurized fluid into chamber 58 and vent the main torque converter chamber, the coupling moves quickly to the right to its illustrated disengaged position. At the same time, pressurized fluid passes through hole 34e and into bore 62 to act against the left face of piston 64 and combine with compressed spring 72 to roll the diaphragm to the right and reset the valve assembly for the next engaging operation. The movement of piston 64 to the right to reset the diaphragm is permitted by the escape of fluid through bleed hole 78 and facilitated by flapper valve 80 which flexes outwardly to uncover auxiliary bleed holes 84.

The combined area of holes 78 and 80 is sufficient to allow the piston and diaphragm assembly to move quickly to its reset position to minimize the possibility of the control being caught in midcycle by another coupling engagement signal occurring shortly after a coupling disengagement signal.

While a preferred embodiment of the invention has been illustrated and described in detail, it will be apparent that various changes and modifications may be made in the disclosed embodiment without departing from the scope or spirit of the invention.

What is claimed is:

1. An annular generally planar coupling adapted to be positioned within a housing of a torque converter transmission for use as a bypass of the torque converter of such transmission and when so positioned defining with the torque converter housing a main chamber at one side of the coupling receiving the torque converter and a secondary chamber at the other side of the coupling, said coupling including:
   A. drive means adjacent a radially inner portion of the coupling adapted to be drivingly connected to a output shaft of the torque converter;
   B. means defining an annular clutching surface on said other side of said coupling on an outer peripheral portion of the coupling adapted for clutching coaction with a confronting inner surface of the housing of the torque converter, said coupling being adapted to be mounted within the housing of the torque converter for axial movement between:
   (1) a disengaged position in which fluid pressure is maintained on said other side of said coupling and said clutching surface is spaced axially from said confronting inner housing surface so that the transmission drives through the torque converter; and
   (2) an engaged position in which fluid pressure is vented at said other side of said coupling and said clutching surface engages said confronting inner housing surface so that the transmission drives through said coupling and the engaged clutching surfaces sealingly separate the main chamber at said one side of said coupling from the secondary chamber at said other side of said coupling; and
   C. a control valve assembly positioned in said outer peripheral portion and including:
   (1) an axially extending bore in said outer peripheral portion opening at said one side of said coupling in said main chamber;
   (2) a rolling diaphragm positioned across the open end of said bore and arranged to traverse said bore between a first position in which it is disposed generally adjacent the open end of said bore and a second position in which it has traversed at least a portion of the axial length of said bore;
   (3) spring means disposed in said bore and arranged to urge said diaphragm toward said first position;
   (4) first fluid passage means opening at one end in said main chamber and at its other end in said bore at a location therealong traversed by said diaphragm; and
   (5) second fluid passage means, having a larger flow capacity than said first fluid passage means, extending between a portion of said bore and said other side of said coupling radially inwardly of such clutching surface.

2. A coupling according to claim 1 wherein:
D. said control valve assembly further includes:
   a rigid cover positioned across the open end of said bore between said diaphragm and said main chamber and having controlled bleed means therein to allow fluid pressure in said main chamber to act against said diaphragm and cause it to gradually traverse between its first and second positions in response to venting of fluid in said secondary chamber.

3. A coupling according to claim 2 wherein:
E. said first fluid passage means comprises a plurality of holes opening at their one ends in the radially outer annular edge of said coupling and at their other ends at axially spaced locations in said bore so that they are successively covered by said diaphragm as it traverses between its first and second positions.

4. A coupling according to claim 3 wherein:
F. said holes lie on a line which is skewed with respect to the central axis of said bore.

5. A coupling according to claim 2 wherein:
E. said spring comprises a coil spring bearing at one end against a blind end of said bore and at its other end against the side of said diaphragm remote from said cover.

* * * * *